(12) United States Patent
Leichter

(10) Patent No.: US 10,739,543 B1
(45) Date of Patent: Aug. 11, 2020

(54) OPTICAL FIBER COATING

(71) Applicant: OFS Fitel, LLC, Norcross, GA (US)

(72) Inventor: Eric J Leichter, Buford, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/275,421

(22) Filed: Feb. 14, 2019

(51) Int. Cl.
*G02B 6/44* (2006.01)

(52) U.S. Cl.
CPC ........... *G02B 6/443* (2013.01); *G02B 6/4486* (2013.01)

(58) Field of Classification Search
CPC .............................. G02B 6/443; G02B 6/4486
See application file for complete search history.

(56) References Cited

U.S. PATENT DOCUMENTS

2008/0044145 A1* 2/2008 Jenkins ................. G02B 6/443
385/113
2016/0109303 A1* 4/2016 Sekine ............... G01D 5/35316
374/162
2017/0168239 A1 6/2017 Nicholson
2017/0219790 A1* 8/2017 Debban ................ G02B 6/4403
2018/0309262 A1* 10/2018 Machida ............... H01S 3/1312

OTHER PUBLICATIONS

Polymicro Technologies, Polymer Coatings for Silica Optical Fiber, www.molex.com/mx_upload/superfamily/polymicro/pdfs/Polymer (undated).
OFS Fitel, LLC, advertisement for Micro Stripper item # 1026A (one page, undated).
3M, High Reliability, Automated Fiber Recoat Process, www.sonotek.com/ wp-content/uploads/2018/07/Optical-Fiber-Coating.pdf (undated).

\* cited by examiner

*Primary Examiner* — Sung H Pak
(74) *Attorney, Agent, or Firm* — Law Office of Leo Zucker; Leo Zucker, Esq.

(57) ABSTRACT

A length of optical fiber has a core, a cladding layer surrounding the core and a coating layer applied over the cladding layer along the fiber for protecting the fiber. The coating layer is applied so that gaps of a certain width are defined intermittently in the coating layer over the length of fiber. The gaps in the coating layer have a depth D that is set to expose the cladding layer enough within the gaps so that the exposed cladding layer and the surrounded core can be fusion spliced or terminated with minimal if any required stripping of the coating layer off of the cladding layer.

6 Claims, 2 Drawing Sheets

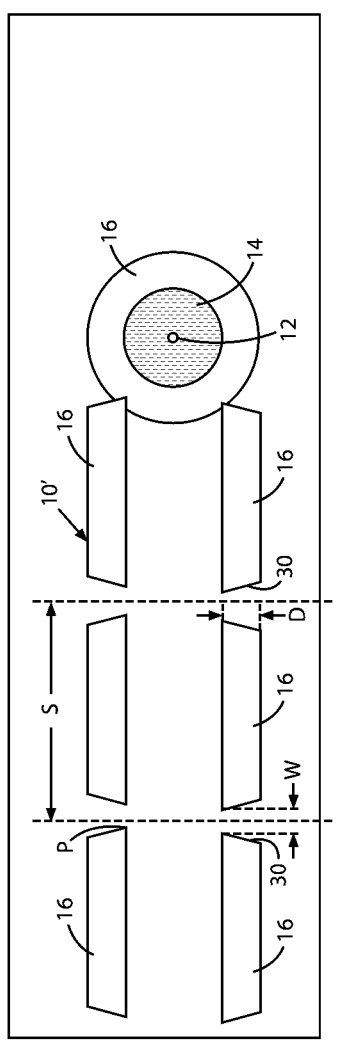

US 10,739,543 B1

OPTICAL FIBER COATING

BACKGROUND OF THE INVENTION

Field of the Invention

The present invention relates generally to the manufacture of optical fibers, and particularly to fibers on which a polymer or other protective coating is applied.

Discussion of the Known Art

Optical fibers are typically provided with a polymer coating that is applied to have a uniform fixed outer diameter over the length of the fiber. The coating protects the fibers from mechanical and chemical damage when they are deployed on site. The use of a completely bare (i.e., uncoated) fiber in the field is not deemed acceptable. Notwithstanding, the fiber coating can act as an impediment when the underlying bare fiber must be exposed, for example, for fusion splicing to another fiber or for termination in an optical connector.

For example, a typical 125 µm diameter glass fiber is usually produced with a coating having an outer diameter of either 200 µm or 250 µm. It is therefore necessary to strip away a length of the coating at one end of the fiber in order to perform a fusion splice. Installers presently use a mechanical or thermal stripper tool to perform this step, which often needs to be repeated several times since the tool removes the coating only roughly after a first pass. A special cleansing wipe must then be used to remove the remnant coating completely before the end of the fiber can be cleaved and inserted into a fusion splice machine for splicing to a similarly prepared fiber. Once the fibers are fused to one another, the fused ends are typically sleeved or recoated with a suitable polymer for protection. Fiber recoating is also used to protect sections of optical fibers along which Fiber Bragg Gratings have been inscribed in the fiber cores. and to protect the end of a fiber from which the coating was stripped when producing a fiber laser. See U.S. Pat. Appl'n Pub. No. 2017/0168239 (Jun. 15, 2017), all relevant portions of which are incorporated by reference.

The coating at the end of an optical fiber must also be cleanly removed in order to terminate the fiber in an optical connector. Because the fiber end must be inserted through a passage in a connector ferrule, wherein the diameter of the passage is typically only 125-126 µm, any remnant coating can prevent the fiber from being properly inserted over the length of the ferrule passage.

SUMMARY OF THE INVENTION

According to the invention, a length of optical fiber includes a core, a cladding layer surrounding the core, and a coating layer applied over the cladding layer along the length of fiber for protecting the fiber. The coating layer is applied so that gaps of a certain width are defined intermittently in the coating layer over the length of fiber, and the gaps in the coating layer have a depth that is set to expose the cladding layer sufficiently within the gaps so that the exposed cladding layer and the surrounded core can be fusion spliced or terminated with minimal if any stripping of any remnant coating on the cladding layer within the gaps.

For a better understanding of the invention, reference is made to the following description taken in conjunction with the accompanying drawing and the appended claims.

BRIEF DESCRIPTION OF THE DRAWING FIGURES

In the drawing;

FIG. 3 is axial cross section of an optical fiber in which the present invention is embodied.

DETAILED DESCRIPTION OF THE INVENTION

Figure 1:
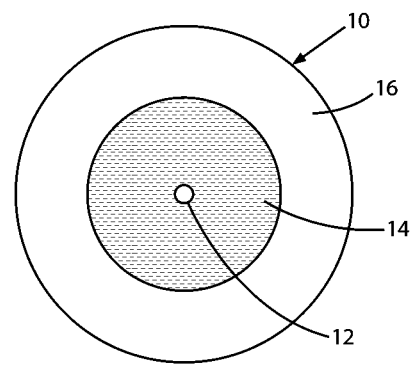
FIG. 1 is a cross section of a single-mode glass optical fiber in which the present invention can be embodied.

FIG. 1 is a cross section of a single-mode glass optical fiber 10 in which the present invention can be embodied. The fiber 10 contains a central glass core 12 having a nominal diameter of 9 µm, and a surrounding glass cladding layer 14 having a nominal outside diameter (O.D.) of 125 µm. As mentioned earlier, the fiber 10 is ordinarily provided with a protective polymer coating layer 16 having a nominal O.D. of up to 250 µm which is typically fixed over the length of the fiber 10. It will be understood from the present disclosure, however, that the invention can be embodied in multi-mode fibers, as well as in fibers having cores and cladding layers of various dimensions.

In addition to the polymer coating layer 16, and as is generally known in the art, a thermoplastic material may be extruded directly over the coating layer 16 up to an O.D. of, e.g., 900 µm to produce a buffer layer. A PVC jacket may then be extruded over the buffer layer together with strength members like aramid yarn to form a fiber optic cable. Also, instead of a buffer layer, the coated fiber 10 may be contained loosely inside a sturdy flexible tube together with strength members and a water blocking gel for outdoor applications.

Figure 2:
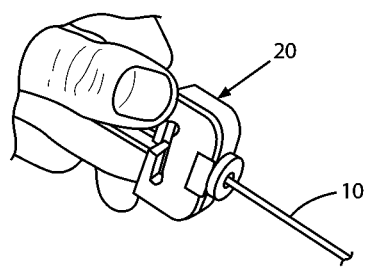
FIG. 2 shows an example of a typical thermal stripping tool for removing a coating and any surrounding buffer layer or jacketing at an end of the optical fiber.

FIG. 2 shows an example of a typical thermal stripper tool 20 used by installers to remove the coating layer 16 together with a surrounding buffer layer at an end of the fiber 10, so that the exposed cladding layer 14 together with the fiber core 12 can be fused to a similarly prepared second fiber, or terminated in an optical connector. Thermal stripper tools are commercially available from, e.g., OFS Fitel, LLC, cat. #1026A which features heated stripping blades to cut through the coating layer 16 and other layers that may surround the coating layer 16 of the fiber 10. Instructions accompanying the mentioned tool call for stripping about 7/16 to one-half inch (11 to 13 mm) of the coating layer 16 from an end of the fiber, and wiping the exposed cladding layer 14 from the edge of the coating layer 16 left on the unstripped fiber, toward the end of the fiber with isopropyl alcohol. Mechanical tools are also commercially available for stripping unbuffered polymer-coated fibers, e.g., item #106826886 from OFS Fitel, LLC.

FIG. 3 shows an axial cross section of an optical fiber 10' according to the invention. In the fiber 10', the coating layer 16 is applied during manufacture so that relatively short gaps 30 are defined intermittently in the coating layer 16 and in any buffer layer over the length of the fiber 10'. The remaining sections of the fiber 10' retain the coating layer 16 and any surrounding layers for protection. For example, the width W of each gap 30 may be one-inch, and the centers of the gaps 30 may be spaced apart by a distance S of five inches. In such a case, the coating coverage on the fiber 10' is still 80 percent. The gap width W and spacing S may also be optimized for a given application of the fiber 10'. Preferably, the width W and the spacing S of the gaps 30 should be set so that at least 50 percent of the total length of the fiber 10' is protected by the coating layer 16.

It will also be appreciated that if one or more of the fibers 10' are deployed in current fiber configurations, whether outside jacketed or loose tube, the fiber 10' will be fully protected by the surrounding jacket or tube. Moreover, mechanically enhanced optical fibers are now available that can tolerate stronger pull tension and which are more durable than conventional fiber.

To splice the intermittently coated fiber 10', an installer simply strips away not more than, e.g., five inches of any jacket, tube, or buffer layer from an end of the fiber 10', so that at least one of the gaps 30 in the coating layer 16 is exposed along the length of the fiber 10'. The installer then cuts away the fiber 10' up to a leading point P of the first exposed gap 30, leaving a clean length W of the cladding layer 14 and the surrounded core 12 ready to fusion splice, and then to sleeve or recoat. Significantly, no thermal or mechanical stripping tool is required. Similarly, for terminating the fiber 10' in a connector, the installer proceeds as above and inserts the clean length W of the cladding layer 14 and core 12 into the connector ferrule without needing to strip the coating layer 16 away from the cladding layer 14.

Also, according to the invention, the depth D of the gaps 30 may be set so that a minimal but finite amount of the coating layer 16 will remain on the cladding layer 14 of the fiber 10' within each gap 30. This embodiment would still make it easier to strip away the coating layer 16 within such gaps, as well as to route the fiber 10' about tight bend radii and otherwise use the regions of the gaps 30 along the fiber 10' to advantage.

While the foregoing represents preferred embodiments of the present invention, it will be understood by persons skilled in the art that various changes, modifications, and additions can be made without departing from the spirit and scope of the invention within the bounds of the following claims.

I claim:

1. A method of splicing an optical fiber, comprising:
   producing an optical fiber having:
   a core;
   a cladding layer surrounding the core, wherein the cladding layer has a first outer diameter (O.D.); and
   a coating layer surrounding the cladding layer along the length of the fiber for protecting the fiber, wherein the coating layer has a second O.D. greater than the first O.D. of the cladding layer;
   applying the coating layer so that gaps of a certain width W are defined intermittently in the coating layer over the length of the fiber, wherein the gaps in the coating layer have a depth D determined to expose the cladding layer and the surrounded core of the fiber substantially over the width of the gaps; and
   splicing the cladding layer and the core of the fiber as exposed over the width of a given one of the gaps with another optical fiber, or terminating the cladding layer and the core of the fiber as exposed over the width of a given one of the gaps in an optical connector.

2. A method of splicing an optical fiber according to claim 1, including determining the width W of each gap and a distance S by which the gaps are spaced apart from one another, so that at least 50 percent of the length of the produced fiber is protected by the coating layer.

3. A method of splicing an optical fiber according to claim 2, wherein the width W of each gap is determined to be about one inch, and the distance S is determined to be about five inches.

4. A method of splicing an optical fiber according to claim 1, including applying a buffer layer over the coating layer of the produced fiber, and forming the gaps through the buffer layer.

5. A method of splicing an optical fiber according to claim 1, including providing a loose tube over the coating layer of the produced fiber, and forming the gaps through the loose tube.

6. A method of splicing an optical fiber according to claim 1, including determining the depth D of the gaps in the coating layer of the produced fiber so that only a sufficient amount of the coating layer remains on the cladding layer within each gap to facilitate routing the fiber about tight bend radii.

* * * * *